(12) United States Patent
MacNutt et al.

(10) Patent No.: US 6,453,062 B1
(45) Date of Patent: Sep. 17, 2002

(54) FINAL ASSEMBLY VISUAL INSPECTION SYSTEM FOR PACKAGED HEART VALVES

(75) Inventors: William MacNutt; Douglas Michalsky, both of Austin, TX (US)

(73) Assignee: Sulzer Carbomedics Inc., Austin, TX (US)

(*) Notice: Subject to any disclaimer, the term of this patent is extended or adjusted under 35 U.S.C. 154(b) by 0 days.

(21) Appl. No.: 09/301,467

(22) Filed: Apr. 28, 1999

(51) Int. Cl.$^7$ .................................................. G06K 9/00
(52) U.S. Cl. ........................ 382/141; 382/174; 382/128
(58) Field of Search .............................. 382/141, 152, 382/146, 174; 206/438; 427/2.1; 623/1.1, 1.26, 2.1, 3.1, 73, 251, 906; 348/86, 92, 94, 95, 128, 129, 130

(56) References Cited

U.S. PATENT DOCUMENTS

| | | | |
|---|---|---|---|
| 4,319,272 A | * 3/1982 | Henry | 358/107 |
| 4,555,798 A | 11/1985 | Broadbent, Jr. et al. | 382/8 |
| 4,845,764 A | * 7/1989 | Ueda et al. | 382/8 |
| 5,067,012 A | * 11/1991 | Lemelson | 358/93 |
| 5,293,428 A | * 3/1994 | Kondou et al. | 382/8 |
| 5,333,208 A | * 7/1994 | Massen | 382/8 |
| 5,657,131 A | 8/1997 | Csipkes et al. | 356/401 |
| 5,721,587 A | 2/1998 | Hirose | 348/921 |
| 5,823,342 A | 10/1998 | Caudillo et al. | 206/438 |
| 6,102,944 A | * 8/2000 | Huynh et al. | 623/2.14 |
| 6,259,960 B1 | * 7/2001 | Inokuchi | 700/110 |
| 6,272,437 B1 | * 8/2001 | Woods et al. | 702/35 |
| 6,285,787 B1 | * 9/2001 | Kawachi et al. | 382/209 |

* cited by examiner

*Primary Examiner*—Joseph Mancuso
*Assistant Examiner*—Anand Bhatnagar
(74) *Attorney, Agent, or Firm*—Timothy L. Scott; Philip S. Lyren

(57) ABSTRACT

A method and apparatus for inspecting heart valves. The method comprises projecting an actual image of a heart valve onto an image receiver, providing target data corresponding to a desired heart valve, comparing the actual image to the target data using a microprocessor, and determining whether the actual image matches the target data. The apparatus comprises a light source, a image receiver, a holder adapted to support a heart valve between said light source and the image receiver such that an actual image of the heart valve is received at the image receiver, a microprocessor in electronic communication with the image receiver. The microprocessor has access to target values for the regions of interest and compares the actual values in each region of interest to the target values to produce an output pass/fail signal.

16 Claims, 2 Drawing Sheets

FINAL ASSEMBLY VISUAL INSPECTION SYSTEM FOR PACKAGED HEART VALVES

TECHNICAL FIELD OF THE INVENTION

The present invention relates generally to inspection systems for packaged heart valves and more particularly to an automated visual inspection system that verifies the presence, correct assembly and orientation of heart valves that have been packaged.

BACKGROUND OF THE INVENTION

The valves of the heart allow fluid to flow in only one direction through the heart as the chambers of the heart contract in sequence to pump blood through the body. Hence, proper operation of the valves is essential to life. For various reasons, one or more of the valves may become defective or diseased, with the result that it no longer performs adequately. It is currently common practice to replace such defective or diseased valves with mechanical or prosthetic valves that provide the same function.

Referring initially to FIG. 1, mechanical prosthetic heart valves typically include a rigid ring or annulus 11 supporting one, two or three rigid leaflets 13. The leaflets are mounted in the annulus so that they can pivot between open and shut positions and thereby control the flow of blood through the valve. In FIG. 1 a bi-leaflet valve is shown with the leaflets in the open position. The rigid annulus 11 and leaflets 13 are commonly formed of pyrolytic carbon, which is a particularly hard and wear-resistant form of carbon. Because pyrolytic carbon is relatively brittle, however, the annulus itself is often surrounded by with a stiffening ring 15, which may be made of titanium or cobalt chromium. In a typical configuration, the annulus and stiffening ring are both captured within a knit fabric sewing cuff or suture cuff 17, as shown in FIG. 1. After the defective or diseased natural valve has been removed, the prosthetic valve is placed into the valve opening and the sewing cuff is sutured to the patient's tissue. Over time, tissue grows into the fabric of the cuff, providing a secure seal for the prosthetic valve. With each contraction of the heart, the leaflets swing open to allow blood to flow, and then closed to prevent backflow, thereby allowing blood to flow in one direction only.

Because the prosthetic valve must fit snugly into the tissue annulus and yet provide the largest possible fluid flow opening, prosthetic valves come in a range of sizes. The incremental increase in diameter from one valve size to the next is typically 2 millimeters and most commercial valve makers provide 5 to 8 valve sizes.

In addition, prosthetic valves are manufactured in a variety of shapes and configurations. For example, aortic valves are configured differently from mitral valves (leaflets open upward instead of downward), a variety of sewing cuff shapes are provided to allow an optimal fit with the heart and tissue annulus, and the valves themselves are provided in a variety of configurations in order to accommodate the various preferences of physicians. FIG. 2 shows an exemplary but not exhaustive variety of assembled heart valves. The variations in prosthesis shape and type, when multiplied by the number of sizes in which those variations are required, results in a large total number of prosthetic profiles. This complexity can affect inspection processes, as discussed below.

While several of the components of a prosthetic heart valve are machine manufactured, final assembly of each valve is typically done by hand. This is because assembly of the cuff onto the annular valve ring requires intricate stitching that is not readily accomplished by a machine. In addition, the valve components must be handled carefully, as they may be permanently but invisibly damaged by the application of excessive stress. Once a prosthetic valve is completely assembled, it is placed in a first package, which supports the valve in a particular desired orientation. The first package is then sealed in a second package, which protects the prosthetic valve from contamination during shipping and storage. The prosthetic valve is sterilized after being sealed in the second package. As part of rigorous quality control procedures, each valve is typically assigned a serial number.

The heart valve manufacturing process typically includes multiple quality control steps, one of which includes a visual inspection of the prosthetic valve as it will be placed in the first package. One purpose of this step is to ensure that the prosthetic valve in question is actually the valve size and type that is supposed to be associated with the assigned serial number. Another purpose is to ensure that the prosthetic valve is properly loaded into the first package. Still another purpose of this inspection step is to ensure that the components of the valve under test are properly assembled and have not become dislodged or broken.

One common method for carrying out the visual inspection system is to allow a human operator to view each valve package and compare it to an image of the valve under test. This method requires that the operator maintain a complete focus on the inspection process and that the inspector accurately compare each unit to the information available on that unit. Hence, it is desirable to provide a system that eliminates human involvement from the inspection process.

BRIEF SUMMARY OF THE INVENTION

The present invention provides an inspection system that is capable of comparing each packaged valve unit to the data record for that unit to ensure that the valve is the size and type that it is supposed to be. The present system uses a visual imaging system that includes a point by point comparison of portions of the actual valve image with expected values that are stored in a database. Hence, the present system is able to inspect and track a virtually unlimited number of different valve types, sizes and configurations and provide a reliable pass/fail output for each unit.

BRIEF DESCRIPTION OF THE DRAWINGS

Other objects and advantages of the invention will become apparent upon reading the following detailed description and upon reference to the accompanying drawings in which.

DETAILED DESCRIPTION OF THE INVENTION

Figure 1:
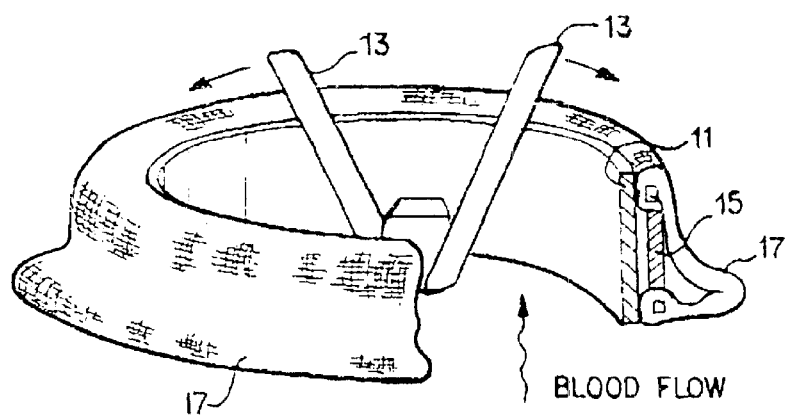
FIG. 1 is a partially cut-away perspective view of a conventional mechanical prosthetic heart valve.
Figure 2:
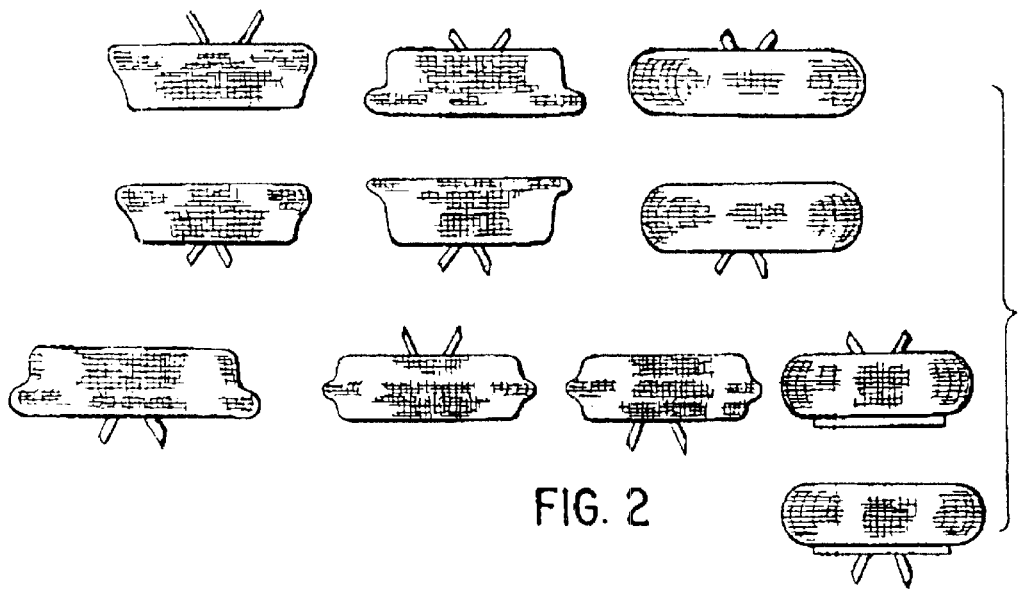
FIG. 2 is an array side views of representative types and configurations of mechanical prosthetic heart valve.
Figure 5:
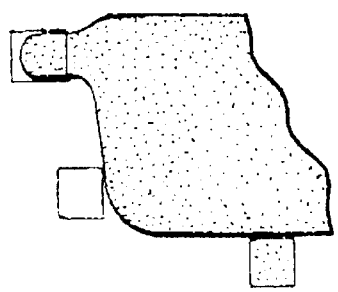
FIG. 5 is a representative actual image of a heart valve showing a preselected set of comparison points.
Figure 3:
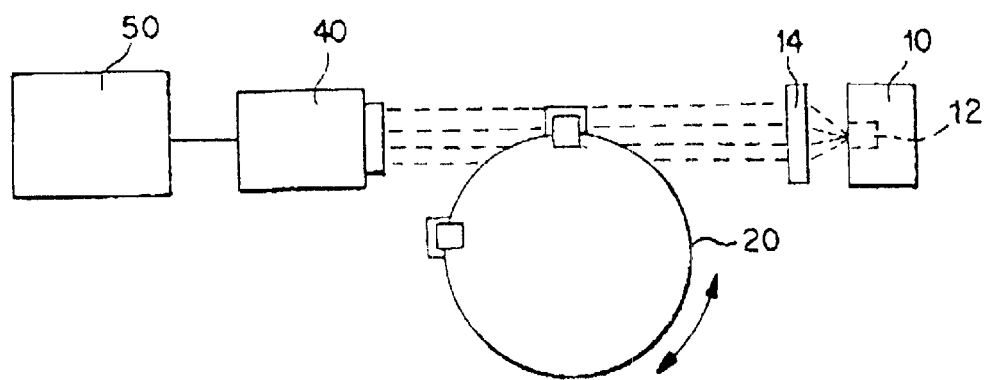
FIG. 3 is a plan view of some of the components of a preferred embodiment of the present invention.
Figure 4:
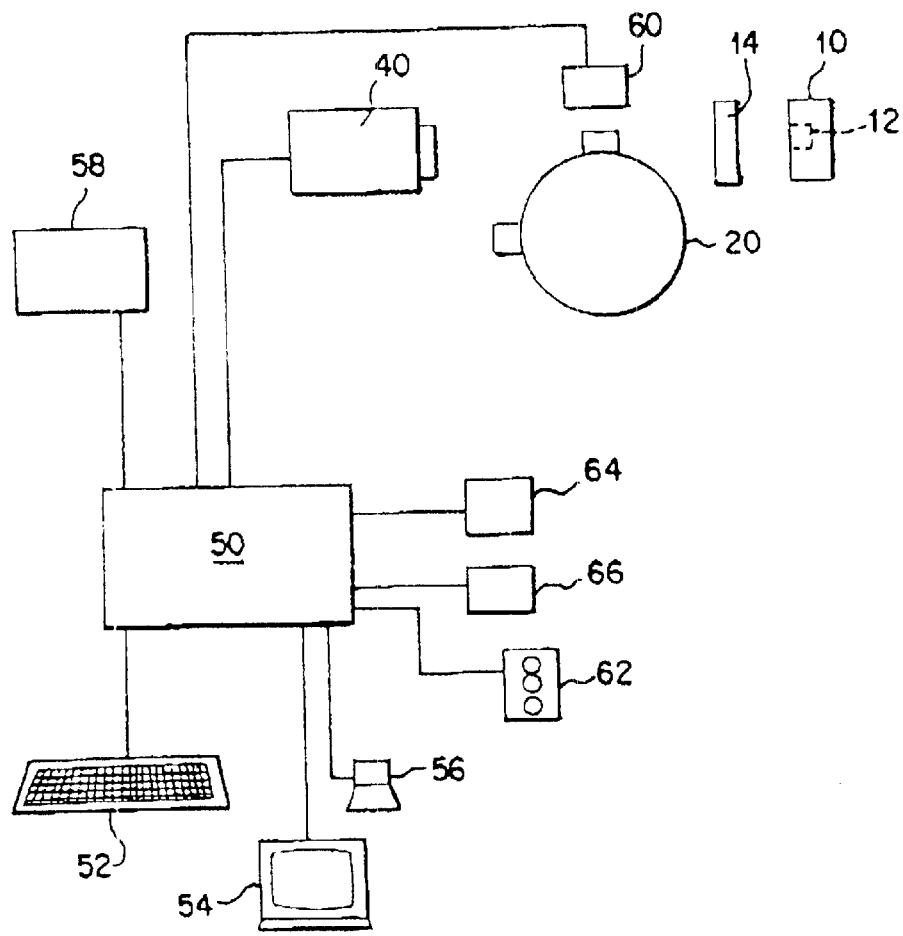
FIG. 4 is a schematic of the present system including the components shown in FIG. 3.

Referring now to FIGS. 3 and 4, a preferred embodiment of the present system includes a light source 10, holder 20, camera 40 and microprocessor 50. Microprocessor 50 is preferably coupled to both light source 10 and camera 40. Microprocessor 50 is also preferably coupled to a keyboard 52, monitor 54, barcode reader 56, network server 58, presence detector 60, indicator lamps 62 and a buzzer 64 (FIG. 4). Microprocessor 50 is provided, either via the network or otherwise, with a database of target attribute sets, each of which corresponds to a particular heart valve type, style, and size. In one preferred embodiment, microprocessor 50 comprises a PCI/ISA bus Pentium 133 Mhz. computer having an installed memory of at least 32 Mbytes. A LAN card is installed for network access, which allows access to network printers and file systems. A handheld bar code scanner is provided for entry of operator badge number and work order number. An example of a preferred, suitable scanner is the "Welch Allyn Scanteam 3400 COD Long Range" scanner. This model connects between the keyboard port on the computer and the keyboard. The output of the scanner looks exactly like a keyboard entry to the computer. Hence, the scanner can be used to provide various identifying information as desired, including the identity of the operator and the work order number. The same information can alternatively be typed into the computer via keyboard 52.

Light source 10 preferably comprises an incandescent bulb, fluorescent bulb, LED array, or other light emitting device, 12, positioned behind a translucent member 14 that serves to diffuse the light from light source 10. Light is preferably piped to diffuser 14 through a fiber optic bundle or the like. In one preferred embodiment, light source 10 is a remote-adjustable Fostec light source. More specifically, a Fostec DCR-II tight source with remote control is preferred in the present system. Setting the front control knob to "R" allows this unit to be controlled by an external 0–5 VDC source. The present system uses the analog output of the LAB-PC1200 DAQ board to control this light source. A Fostec 3×3 area backlight is used for illumination.

The imaging chain for the VOIS system consists of a CCIR standard camera, Matrox image processor, and a Computar lens. Camera 40 is preferably a Sony XC-75CE CCD with 752×582 pixel resolution, or other suitable device. The image acquisition board is preferably a Matrox Pulsar image processor board or other with non-destructive video overlay capability. The Computar lens uses a 5 mm extension ring to set the proper field of view (approx. 0.900" wide). The Pulsar, with the use of the Matrox MIL software (discussed hereafter), provides the primary video display, video image acquisition from the CCIR camera, "blob analysis" functions used in calibration, image averaging to reduce image noise, and provides graphics output for image display. It will be understood, however, that camera 40 can alternatively be a digital camera, an array of photosensors, or any other device capable of receiving and transmitting an image.

The diffuse light from member 14 shines past holder 20 and is received at camera 40 as a silhouette image of holder 20 and whatever other object may be between light source 10 and camera 40. In one preferred embodiment, components of the present system are enclosed in a housing 70. Housing 70 provides a stable imaging platform for inspection of the valve. All electronics are preferably housed in enclosure 70. Special care has been taken in the design to allow alcohol cleaning of the entire enclosure without harming any of the internal components. The camera and backlight are also completely enclosed.

When it is desired to inspect a heart valve, the identification number of that valve is input into microprocessor 50 via keyboard 52, barcode reader 56 or other means. The microprocessor uses work order information from a database or other source to determine the type, style and size that are associated with that particular valve. Data Acquisition is preferably handled through use of a board such as National Instruments LAB-PC-1200 board. This is a 12 bit board that also has 8 digital TTL lines and 2 analog output lines.

The microprocessor uses this information in turn to select a set of target values from a database. The valve to be inspected is then placed in holder 20 and positioned between light source 10 and camera 40 (FIG. 3). Holder 20 is preferably a rotatable table with at least one slot for receiving and supporting an assembled heart valve.

In one preferred embodiment, microprocessor 50 includes a "go" button 66 for controlling the system and initiating the inspection process for each valve. Alternatively the "go" command can be given via keyboard 52, the network 58, or the like. Microprocessor 50 signals the light source to turn on, which causes a silhouette image of the valve to be formed at camera 40. Camera 40 transmits this image data to microprocessor 50.

Microprocessor 50 preferably includes software that performs a point-by-point comparison of the actual image to the target image attribute set. In one preferred embodiment, the software is written to interact with image processing software such as that sold under the name MIL (Matrox Imaging Language) by Matrox Corporation. The points that are compared preferably comprise a preselected set of points, or regions of interest (ROI's), that correspond to critical boundary regions of the image. The preselected ROI's may be a set associated with each valve type, or may comprise a universal set that includes sufficient points to allow differentiation and identification of all of the possible configurations of valves that may be inspected. Thus, for example, ROI's lying on either side of critical boundaries for each valve type may be included in the preselected set of points. It will be understood that a target attribute set for comparison purposes is typically, but not necessarily, embodied solely in the target values assigned to a set of ROI's, rather than comprising an actual complete image. Similarly, the "actual image" may comprise merely a record of actual values for the same set of ROI's, rather than a record of the entire image of the valve being inspected.

If the values for all of the actual image ROI's match the corresponding target values for that valve type, the valve is deemed to have "passed" the visual inspection test. It then re-enters the manufacturing process for further packaging, further testing, or the like. If any of the points that are compared does not have the same value as the corresponding point in the target attribute set, the valve is deemed to have "failed" the inspection. In one preferred embodiment, a failed test is signaled by indicator lamps 62, (green for a "pass" and red for a "fail"), and/or buzzer 64.

According to one preferred embodiment, some of the foregoing components can be grouped together on a control panel (not shown). For example, a preferred control panel may include the following components: a "Go" button, preferably a truck capacitive switch that signals the system that the operator is ready to test; an "Engage" light, which is a visual indicator to the operator that the switch is properly contacted; a "Bad cuff" light, preferably a red light that indicates that the cuff check failed; a "Bad leaflet" light, preferably a red light that indicates that the leaflet check failed; and a "Good valve" light, preferably a green light that indicates that the valve passed the inspection. All lights are 12 volt DC LED lights. External current limiting resistors are not required for these lights.

A National Instruments ER8 relay board is used to control the panel lights. If desired, one of the analog outputs from the relay board can be wired directly to the Fostec light source to control the light level (0–5 vdc). The system handles failed valves in any preferred manner, such as are known in the art.

According to one preferred embodiment of the present system, the preselected set of points that are used to compare the actual image to the target image attribute set include subsets particularly designed to determine whether the leaflets and cuff of each valve are properly positioned. These subsets allow the system to output particular pass/fail data for each valve that include more specific failure information relating to the leaflets and cuff. To facilitate inspection of the leaflets, the holder is preferably designed to support the valve in a position that allows gravity to maintain the leaflets in their open position.

EXAMPLE

The following detailed discussion is intended as exemplary only, and is not to be considered limiting. Once an image has been received, the imaging system makes a decision based on the gray level of a region of interest (ROI) in the area being inspected. The size and position of the ROI is determined from dimensions given in the valve drawing or specification, size and position offsets previously stored in a database, or other suitable source. Edge detection is used to find the outer edge of the cuff. This determines the placement of the ROI. A subroutine in the software returns the X component, using in a vertical edge find, for the "best edge." Also returned is the Y position where the maximum edge location was found. This indicates the portion of the cuff having the largest diameter. The ROI is then refined based on predetermined values. The ROI position is then further refined by the offset amount determined during the last calibration run. The calibration routine, described below, images a known standard object and computes the X and Y offsets from the ideal location. Hence, the calibration routine determines any offset in the camera/fixture relationship. Once the ROI has been determined, the image data in that region is binarized for further processing.

The present system preferably includes an erosion algorithm that eliminates any identification tag string or other extraneous material that may appear in the actual image, but which does not factor into the inspection.

Likewise, the system includes the ability to compensate for slight deviations in the actual image that should not affect the passing rate. For instance, because the cuff or sleeve of each heart valve is made of fabric, it can be slightly bent out of position. In this case, the actual image may vary only slightly from the target image, and the valve should pass, because the valve is actually properly constructed. The present system is designed to recognize such situations and not to provide false negative results. One way to accomplish this is to compute the gray level average for each ROI and compare it to a predetermined level.

Similarly, a preferred embodiment of the present system includes an apparatus for confirming that the valve is actually changed between tests. More specifically, the system includes a proximity detector connected to microprocessor 50 such that microprocessor 50 will not commence a new test until it has been signaled that holder 10 has been without a valve for at least some interval since the previous test. Hence, if the operator should fail to remove a tested valve from holder 10, the system will "know" this fact and will prevent further testing.

For example, in one preferred embodiment, a Banner optical proximity sensor is used to confirm that valves are actually changed between tests. This prevents the operator from forgetting to test the valve and going to the next valve, or from testing the same valve twice. The sensor is a "convergent mode" type that emits visible red light (650 nm), and detects reflected light off the target (i.e. the valve). Sensing range ¼" to about 1¾", depending on the target material. The "valve detect" proximity sensor is wired to a digital input.

The present system preferably includes a calibration mode, in which actual images of a known item are compared to an attribute set for that item, in order to verify the camera/fixture relationship, and to provide correction information for calibrating further actual images, if necessary. For example, in one preferred embodiment, the calibration function acquires the image of a backlit circle standard, using controlled light levels, and uses blob analysis to equate the circle image to an equivalent ellipse. In other words, the moments of inertia of the circle blob are computed, from which major and minor axis lengths of the elliptical image are computed. As mentioned elsewhere, due mainly to camera and digitizer timing, the image aspect ratio will not be 1.0. The ratio of major and minor axes yields the aspect ratio of the image, and the Y-axis dimension (major or minor axis length, depending on eccentricity of the ellipse) in pixels is used to provide the "pixels-per-inch" magnification scale factor, given the known diameter of the circle in inches. A check for accurate computation of the circle standard diameter is made by using blob analysis, with the determined aspect ratio, using the area of the circle and the relationship $A=\pi r^2$. A ±1 pixel circular tolerance band is then generated over the circle standard image to verify that the circle standard edge appears within this tolerance band as a check that a good image and good image threshold were used in binarizing the circle image.

The present system is preferably designed to recognize disruptions in the power supply and to give an error message if a given test has been invalidated. That test can then be re-run.

While the present invention has been described in terms of mechanical prosthetic heart valves, it will be understood that it can be applied with equal utility to tissue valves, polymer valves and the like.

Our invention may be embodied in other specific forms without departing from the spirit or essential characteristics thereof. Our invention therefore, is to be defined by the appended claims, and not by the foregoing description. All variations that come within the meaning and equivalence of claimed elements, are therefore intended to be included therein.

What is claimed is:

1. A method for inspecting a heart valve assembly comprising the steps of:
    (a) placing a heart valve comprising a cuff and a leaflet assembly in a holder for inspection;
    (b) projecting an image of the heart valve onto an image receiver;
    (c) creating digital data from the image of the heart valve, said data representing the actual position of at least one component of the heart valve selected from the group consisting of the cuff of the heart valve and the leaflet assembly of the heart valve;
    (d) providing digital data representing the desired position of at least one component of the heart valve selected from the group consisting of the cuff of the heart valve and the leaflet assembly of the heart valve;

(e) comparing the data representing the actual position of at least one component of the heart valve to the data representing the desired position of at least one component of the heart valve; and (f) using the comparison of data set forth in step (e) to verify at least one property of the heart valve selected from the group consisting of the type of heart valve, the size of the heart valve, and the style of the heart valve.

2. The method of claim 1 wherein step (e) comprises comparing data representing the actual positions of the cuff and the leaflet assembly of the heart valve inspected to data representing the desired positions of the cuff and the leaflet assembly.

3. The method of claim 2 where in the image of the heart valve is a silhouette and wherein the data representing the desired position corresponds to grayscale images.

4. The method of claim 1 further comprising the step of providing a database from which the data representing the desired position of at least one component is selected.

5. The method of claim 4 comprising the additional steps of receiving an identification number for the valve to be inspected and selecting data representing an image of the desired position of a component from the database on the basis of the identification number.

6. The method of claim 1 wherein the data compared is data corresponding to grayscale images.

7. The method of claim 1 comprising the step of confirming that the heart valve has been removed from the holder after inspection.

8. The method of claim 1 further comprising the step of determining whether the actual position of at least one component of the heart valve selected from the group consisting of the cuff and the leaflet assembly is within a predetermined deviation from the desired position of at least one component of the heart valve selected from the group consisting of the cuff of the heart valve and the leaflet assembly of the heart valve.

9. A system for inspecting heart valve assemblies comprising:

(a) a light source;

(b) an image receiver;

(c) a holder for a heart valve comprising a cuff and a leaflet assembly, said holder being positioned between the light source and the image receiver such that an actual image of the heart valve is received at the image receiver;

(d) an image processor for creating digital data from the actual image of the heart valve, said digital data representing the actual position of at least one component of the heart valve selected from the group consisting of the cuff of the heart valve and the leaflet assembly of the heart valve;

(e) a computer system for storing digital data representing the desired position of at least one component of the heart valve selected from the group consisting of the cuff of the heart valve and the leaflet assembly of the heart valve; and (f) software for comparing the data representing the actual position of at least one component of the heart valve with the data representing the desired position of at least one component of the heart valve and for generating an output signal verifying at least one property of the heart valve selected from the group consisting of the type of heart valve, the size of the heart valve, and the style of the heart valve.

10. The system of claim 9 comprising an indicator for providing a visual indication of the output signal.

11. The system of claim 9 wherein the software compares data representing the positions of the cuff and the leaflet assembly of the heart valve inspected to data representing the desired positions of the cuff and leaflet assembly.

12. The system of claim 9 the computer system comprises a database of data representing the desired position of at least one component of the heart valve.

13. The system of claim 9 comprising a detector for confirming that the heart valve inspected has been removed from the holder following inspection of the heart valve.

14. The system of claim 9 wherein the data representing the desired position of at least one component of the heart valve corresponds to a grayscale image.

15. The system of claim 9 further comprising a bar-code reader coupled to the computer.

16. The system of claim 9 wherein the holder is configured to support the heart valve such that gravity maintains leaflets of the leaflet assembly in an open position.

* * * * *